United States Patent
Takahashi

(10) Patent No.: US 8,442,351 B2
(45) Date of Patent: May 14, 2013

(54) IMAGE ORIENTATION DETERMINATION DEVICE, IMAGE ORIENTATION DETERMINATION METHOD, AND IMAGE ORIENTATION DETERMINATION PROGRAM

(75) Inventor: Yusuke Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 209 days.

(21) Appl. No.: 13/128,158

(22) PCT Filed: Oct. 13, 2009

(86) PCT No.: PCT/JP2009/005321
§ 371 (c)(1),
(2), (4) Date: May 6, 2011

(87) PCT Pub. No.: WO2010/052830
PCT Pub. Date: May 14, 2010

(65) Prior Publication Data
US 2011/0206275 A1  Aug. 25, 2011

(30) Foreign Application Priority Data
Nov. 6, 2008  (JP) .................................. 2008-284979

(51) Int. Cl.
*G06K 9/36* (2006.01)
(52) U.S. Cl.
USPC ........... 382/276; 382/190; 382/209; 382/282; 382/305; 358/537; 358/538
(58) Field of Classification Search ................... 382/190, 382/209, 219, 275, 279, 282, 305; 358/1.2, 358/3.26, 537, 538
See application file for complete search history.

(56) References Cited

U.S. PATENT DOCUMENTS

| 7,333,963 | B2 * | 2/2008 | Widrow et al. | 706/18 |
| 7,505,609 | B1 * | 3/2009 | Hartman et al. | 382/103 |
| 7,620,202 | B2 * | 11/2009 | Fujimura et al. | 382/103 |
| 7,657,120 | B2 * | 2/2010 | Aradhye | 382/290 |
| 7,974,475 | B1 * | 7/2011 | Minter | 382/209 |

FOREIGN PATENT DOCUMENTS

| JP | 08-118273 | 5/1996 |
| JP | 2000-241846 | 9/2000 |
| JP | 2001-111806 | 4/2001 |
| JP | 2005-202477 | 7/2005 |
| JP | 2005-250778 | 9/2005 |

OTHER PUBLICATIONS

International Search Report, PCT/JP2009/005321, Nov. 24, 2009.
Wang et al., "Content-Based Image Orientation Detection with Support Vector Machines", pp. 17-23, IEEE Workshop Content-Based Access of Image and Video Libraries, 2001.

* cited by examiner

Primary Examiner — Yosef Kassa
(74) Attorney, Agent, or Firm — Young & Thompson

(57) ABSTRACT

When positive image similarity (degree of training image similarity between input image features and those of positive training image) is higher than a predetermined first threshold, image orientation determination decision section determines input image orientation. When negative image similarity (degree of training image similarity between input image features and those of a negative training image) is not lower than a predetermined second threshold value, the image orientation determination decision section does not determine input image orientation. When the image orientation determination decision section determines the orientation of the input image, image orientation determination section calculates orientation similarity reflecting similarity between input image features and those stored in orientation-specific features storage section. If the calculated orientation similarity satisfies a predetermined condition, the image orientation determination section determines input image orientation according to positive training image orientation related to the image features stored in the orientation-specific features storage section.

36 Claims, 6 Drawing Sheets

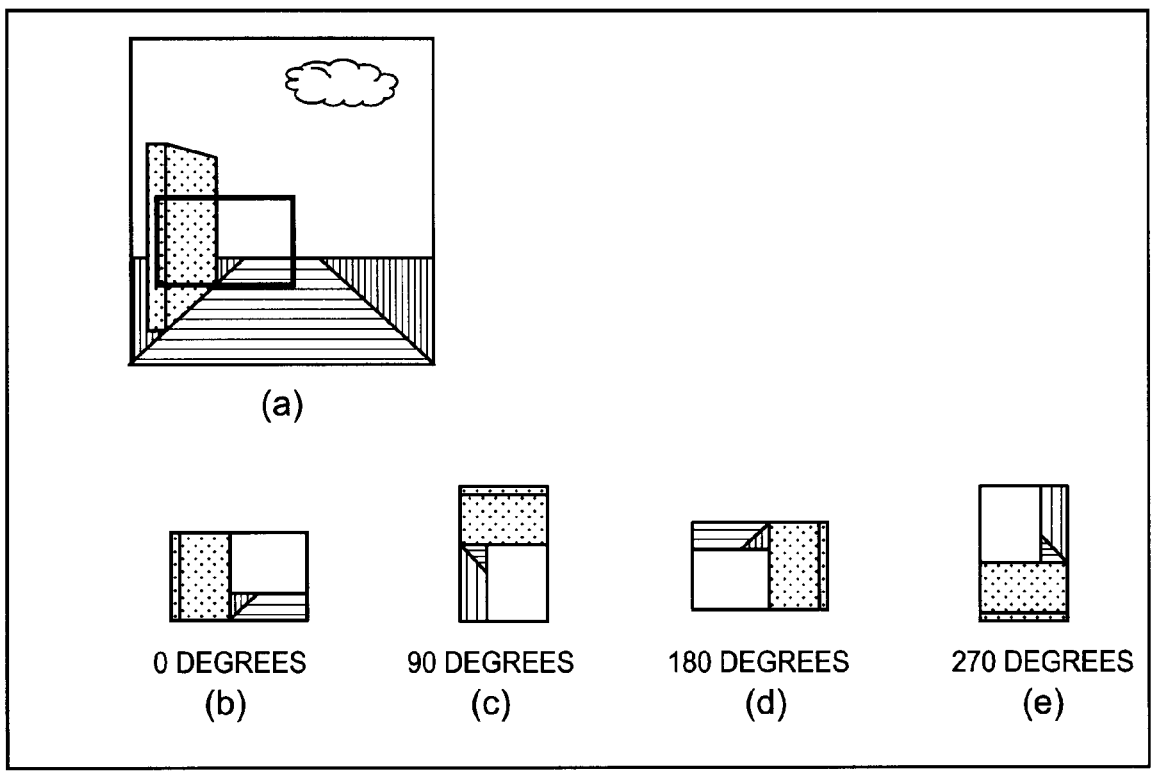

IMAGE ORIENTATION DETERMINATION DEVICE, IMAGE ORIENTATION DETERMINATION METHOD, AND IMAGE ORIENTATION DETERMINATION PROGRAM

TECHNICAL FIELD

The present invention relates to an image orientation determination device, image orientation determination method, and image orientation determination program for determining the orientation of an image.

BACKGROUND ART

An image shot, for instance, by a digital camera is not always oriented in a proper direction depending on how the camera is held. To provide efficient image management, therefore, it is desirable that the orientation of the image be corrected as needed to display the image in proper orientation.

An image orientation determination method for automatically determining the horizon to zenith direction of an image is described in Patent Document 1. The determination method described in Patent Document 1 analyzes pixel values of a color image to acquire predefined image feature information, which describes the features of the color image. A determination rule based on the image feature information is then used to determine the horizon to zenith direction of the color image.

A method of recognizing the top and bottom of an image is described in Patent Document 2. The method described in Patent Document 2 sets a substantially U-shaped area, which is formed along three of four sides of an image outline, as a determination area for identifying the top and bottom of a designated image, obtains the maximum and minimum values of pixels within the determination area, and identifies the top and bottom of the image in accordance with the difference between the maximum and minimum values.

A face image orientation determination method for accurately determining the orientation of an image including a human face as a subject is described in Patent Document 3. The determination method described in Patent Document 3 acquires a face image including a human face, and detects eyes and a mouth from the acquired face image. This determination method determines the orientation of the face image in accordance with the positional relationship between the detected eyes and mouth in the acquired face image.

An image upper side determination method for determining how a camera is held for shooting is described in Patent Document 4. The determination method described in Patent Document 4 compares total brightness information values of four corners of an image, recognizes the brightest side as the top end of the image, that is, as the upper side of the image when it is viewed, and eventually determines how the camera is held.

A determination method for determining the orientation of an image in accordance with its composition is described in Non-Patent Document 1. The method described in Non-Patent Document 1 extracts low-level features of the image, and determines the orientation of the image by allowing the low-level features of a sample image to be machine-learned.

CITATION LIST

Patent Literature

Patent Document 1 JP-A-2005-250778 (Paragraphs 0078, 0079, and 0086, FIG. 2).

Patent Document 2 JP-A-2001-111806 (Paragraphs 0031 to 0036, FIG. 7).

Patent Document 3 JP-A-2005-202477 (Paragraphs 0041 to 0044, FIG. 3).

Patent Document 4 JP-A-2000-241846 (Paragraph 0060, FIG. 3).

Non-Patent Literature

Non-Patent Document 1 Yongmei Wang, Hongjiang Zhang, Content-Based Image Orientation Detection with Support Vector Machines, Proc. IEEE Workshop Content-Based Access of Image and Video Libraries, 2001.

SUMMARY OF INVENTION

Technical Problem

When the methods described in Patent Documents 1 to 4 are used, it is necessary to extract special targets (e.g., a face and an empty area) and set up a semantic rule (a rule pertaining to the different meanings of words or other symbols) for each target. Therefore, the methods cannot be applied to certain types of images for which a semantic rule cannot easily be set up.

When the method described in Non-Patent Document 1 is used, an image compared to determine the orientation of an input image (this image is hereinafter referred to as a training image) is compared against an image obtained by changing the orientation of the input image. The result of comparison is then turned into a score. When the highest score is greater than a threshold value, it is concluded that the associated orientation is the orientation of the image. Therefore, if the training image is compared against an image involving small features changes when an image orientation changes (i.e., an image whose features changes do not correlate with changes in the image orientation), the resulting determination is unlikely to be in error. If, in contrast, the training image is compared against an image involving great features changes when the image orientation changes (i.e., an image whose features changes significantly correlate with changes in the image orientation), the resulting determination is likely to be in error. If the image orientation is corrected in accordance with such an erroneous determination, it is difficult to properly view the image because it is displayed in improper orientation.

Problems of the method described in Non-Patent Document 1 will now be described in detail with reference to image examples in FIGS. 9 and 10. In the subsequent description, it is assumed that the image shown in FIG. 9(a) is a training image.

When the image shown in FIG. 9(b) is an input image, the image shown in FIG. 9(b) is not significantly different from the image shown in FIG. 9(a) in the degree of visual descriptors (features) although the image shown in FIG. 9(b) is obtained by adding a small area to the left-hand side of the image shown in FIG. 9(a). Therefore, there is a high degree of similarity between the images shown in FIGS. 9(a) and (b). The images shown in FIG. 9(c) to (e) are obtained by rotating the image shown in FIG. 9(b) 90 degrees clockwise, 180 degrees clockwise, and 270 degrees clockwise, respectively. However, the image shown in FIG. 9(a) greatly differs in features from the differently oriented images (the images shown in FIG. 9(c) to (e)). Therefore, there is a low degree of similarity between the image shown in FIG. 9(a) and the differently oriented images. Consequently, it is concluded that the image shown in FIG. 9(b) is oriented 0 degrees. In other words, it is unlikely that the input image shown in FIG. 9(b) will be erroneously determined.

Meanwhile, an input image obtained by shooting a portion enclosed within a thick black outline in FIG. 10(a) is shown in FIG. 10(b). The images shown in FIG. 10(c) to (e) are obtained by rotating the image shown in FIG. 10(b) 90 degrees clockwise, 180 degrees clockwise, and 270 degrees clockwise, respectively. When compositions of the images shown in FIG. 10(b) to (e) are compared, the image rotated 270 degrees (FIG. 10(e)), which is oriented differently from the correct direction, is the most similar to the training image shown in FIG. 9(a). The images in figures other than FIG. 10(e) are not remotely similar to the training image shown in FIG. 9(a). Therefore, the image orientation is erroneously determined to be 270 degrees.

The input image shown in FIG. 10(b) is a part of the training image. Therefore, its characteristic portion is highly similar to the training image. However, if the rotation of an image greatly changes features indicative of the composition of the image, it is likely that the image orientation will be erroneously determined.

The present invention has been made in view of the above circumstances and has an object to provide an image orientation determination device, image orientation determination method, and image orientation determination program that reduce the possibility of erroneously determining the image orientation.

Solution to Problem

An image orientation determination device according to one aspect of the present invention includes: image features extraction means for extracting from an input image, image features indicative of a disposition feature of each element included in an image; image features storage means for storing the image features of a positive training image, which is an image appropriate for image orientation determination, and the image features of a negative training image, which is an image inappropriate for image orientation determination; orientation-specific features storage means for storing the orientation of the positive training image in relation to image features; image similarity calculation means for calculating training image similarity indicative of the degree of similarity between the image features of the input image that is extracted by the image features extraction means and the image features of the positive training image and negative training image that are stored in the image features storage means; image orientation determination decision means for deciding to determine the orientation of the input image when positive image similarity, which is the degree of training image similarity between the image features of the input image and the image features of the positive training image, is higher than a predetermined first threshold value, and deciding not to determine the orientation of the input image when negative image similarity, which is the degree of training image similarity between the image features of the input image and the image features of the negative training image, is not lower than a predetermined second threshold value; and image orientation determination means for, when the image orientation determination decision means has decided to determine the orientation of the input image, calculating orientation similarity indicative of the degree of similarity between the image features of the input image and the image features stored in the orientation-specific features storage means, and determining the orientation of the input image in accordance with the orientation of the positive training image related to the image features stored in the orientation-specific features storage means when the calculated orientation similarity satisfies a predetermined condition.

The image orientation determination device according to another aspect of the present invention includes: image features extraction means for extracting from an input image, image features indicative of a disposition feature of each element included in an image; image features storage means for storing the image features of a negative training image, which is an image inappropriate for image orientation determination; orientation-specific features storage means for storing the orientation of a positive training image, which is an image appropriate for image orientation determination, in relation to image features; image similarity calculation means for calculating training image similarity indicative of the degree of similarity between the image features of the input image that is extracted by the image features extraction means and the image features of the negative training image that is stored in the image features storage means; image orientation determination decision means for deciding not to determine the orientation of the input image when the degree of training image similarity between the image features of the input image and the image features of the negative training image is not lower than a predetermined threshold value, and deciding to determine the orientation of the input image when the degree of training image similarity between the image features of the input image and the image features of the negative training image is lower than the predetermined threshold value; and image orientation determination means for, when the image orientation determination decision means has decided to determine the orientation of the input image, calculating orientation similarity indicative of the degree of similarity between the image features of the input image and the image features stored in the orientation-specific features storage means, and determining the orientation of the input image in accordance with the orientation of the positive training image related to the image features stored in the orientation-specific features storage means when the calculated orientation similarity satisfies a predetermined condition.

The image orientation determination device according to still another aspect of the present invention includes: image features extraction means for extracting from an input image, image features indicative of a disposition feature of each element included in an image; image features storage means for storing the image features of a positive training image, which is an image appropriate for image orientation determination; orientation-specific features storage means for storing the orientation of the positive training image in relation to image features; image similarity calculation means for calculating training image similarity indicative of the degree of similarity between the image features of the input image that is extracted by the image features extraction means and the image features of the positive training image that is stored in the image features storage means; image orientation determination decision means for deciding to determine the orientation of the input image when the degree of training image similarity between the image features of the input image and the image features of the positive training image is higher than a predetermined threshold value; and image orientation determination means for, when the image orientation determination decision means has decided to determine the orientation of the input image, calculating orientation similarity indicative of the degree of similarity between the image features of the input image and the image features stored in the orientation-specific features storage means, and determining the orientation of the input image in accordance with the orientation of the positive training image related to the image features stored in the orientation-specific features storage means when the calculated orientation similarity satisfies a predetermined condition.

An image orientation determination method according to one aspect of the present invention includes: extracting from an input image, image features indicative of a disposition feature of each element included in an image; calculating training image similarity indicative of the degree of similarity between the extracted image features of the input image and image features stored in image features storage means for storing the image features of a positive training image, which is an image appropriate for image orientation determination, and the image features of a negative training image, which is an image inappropriate for image orientation determination; deciding to determine the orientation of the input image when positive image similarity, which is the degree of training image similarity between the image features of the input image and the image features of the positive training image, is higher than a predetermined first threshold value, and deciding not to determine the orientation of the input image when negative image similarity, which is the degree of training image similarity between the image features of the input image and the image features of the negative training image, is not lower than a predetermined second threshold value; and, when a decision is made to determine the orientation of the input image, calculating orientation similarity indicative of the degree of similarity between the image features of the input image and image features stored in orientation-specific features storage means for storing the orientation of the positive training image in relation to image features, and determining the orientation of the input image in accordance with the orientation of the positive training image related to the image features stored in the orientation-specific features storage means when the calculated orientation similarity satisfies a predetermined condition.

The image orientation determination method according to another aspect of the present invention includes: extracting from an input image, image features indicative of a disposition feature of each element included in an image; calculating training image similarity indicative of the degree of similarity between the extracted image features of the input image and image features stored in image features storage means for storing the image features of a negative training image, which is an image inappropriate for image orientation determination; deciding not to determine the orientation of the input image when the degree of training image similarity between the image features of the input image and the image features of the negative training image is not lower than a predetermined threshold value, and deciding to determine the orientation of the input image when the degree of training image similarity between the image features of the input image and the image features of the negative training image is lower than the predetermined threshold value; and, when a decision is made to determine the orientation of the input image, calculating orientation similarity indicative of the degree of similarity between the image features of the input image and image features stored in orientation-specific features storage means for storing the image features in relation to the orientation of a positive training image, which is an image appropriate for image orientation determination, and, when the calculated orientation similarity satisfies a predetermined condition, determining the orientation of the input image in accordance with the orientation of the positive training image related to the image features stored in the orientation-specific features storage means.

The image orientation determination method according to still another aspect of the present invention includes: extracting from an input image, image features indicative of a disposition feature of each element included in an image; calculating training image similarity indicative of the degree of similarity between the extracted image features of the input image and image features stored in image features storage means for storing the image features of a positive training image, which is an image appropriate for image orientation determination; deciding to determine the orientation of the input image when the degree of training image similarity between the image features of the input image and the image features of the positive training image is higher than a predetermined threshold value; and, when a decision is made to determine the orientation of the input image, calculating orientation similarity indicative of the degree of similarity between the image features of the input image and image features stored in orientation-specific features storage means for storing the image features in relation to the orientation of the positive training image, and, when the calculated orientation similarity satisfies a predetermined condition, determining the orientation of the input image in accordance with the orientation of the positive training image related to the image features stored in the orientation-specific features storage means.

An image orientation determination program according to one aspect of the present invention causes a computer to perform: an image features extraction process for extracting from an input image, image features indicative of a disposition feature of each element included in an image; an image similarity calculation process for calculating training image similarity indicative of the degree of similarity between the image features of the input image that is extracted in image features extraction step and image features that is stored in image features storage means for storing at least the image features of a negative training image, which is an image inappropriate for image orientation determination, the image features storage means being capable of storing not only the image features of the negative training image but also the image features of a positive training image, which is an image appropriate for image orientation determination; an image orientation determination decision process for deciding to determine the orientation of the input image when positive image similarity, which is the degree of training image similarity between the image features of the input image and the image features of the positive training image, is higher than a predetermined first threshold value, and deciding not to determine the orientation of the input image when negative image similarity, which is the degree of training image similarity between the image features of the input image and the image features of the negative training image, is not lower than a predetermined second threshold value; and, when a decision is made in an image orientation determination decision step to determine the orientation of the input image, an image orientation determination process for calculating orientation similarity indicative of the degree of similarity between the image features of the input image and image features stored in orientation-specific features storage means for storing the orientation of the positive training image in relation to the image features, and determining the orientation of the input image in accordance with the orientation of the positive training image related to the image features stored in the orientation-specific features storage means when the calculated orientation similarity satisfies a predetermined condition.

The image orientation determination program according to another aspect of the present invention causes a computer to perform: an image features extraction process for extracting, from an input image, image features indicative of a disposition feature of each element included in an image; an image similarity calculation process for calculating training image similarity indicative of the degree of similarity between the image features of the input image that is extracted in the image features extraction process and image features that is stored in image features storage means for storing the image features of a negative training image, which is an image inappropriate for image orientation determination; an image orientation determination decision process for deciding not to determine the orientation of the input image when the degree of training image similarity between the image features of the input image and the image features of the negative training image is not lower than a predetermined threshold value, and deciding to determine the orientation of the input image when the degree of training image similarity between the image features of the input image and the image features of the negative training image is lower than the predetermined threshold value; and, when a decision is made in the image orientation determination decision process to determine the orientation of the input image, an image orientation determination process for calculating orientation similarity indicative of the degree of similarity between the image features of the input image and image features stored in orientation-specific features storage means for storing the image features in relation to the orientation of a positive training image, which is an image appropriate for image orientation determination, and, when the calculated orientation similarity satisfies a predetermined condition, determining the orientation of the input image in accordance with the orientation of the positive training image related to the image features stored in the orientation-specific features storage means.

The image orientation determination program according to still another aspect of the present invention causes a computer to perform: an image features extraction process for extracting from an input image, image features indicative of a disposition feature of each element included in an image; an image similarity calculation process for calculating training image similarity indicative of the degree of similarity between the image features of the input image that is extracted in the image features extraction process and image features that is stored in image features storage means for storing the image features of a positive training image, which is an image appropriate for image orientation determination; an image orientation determination decision process for deciding to determine the orientation of the input image when the degree of training image similarity between the image features of the input image and the image features of the positive training image is higher than a predetermined threshold value; and, when a decision is made in the image orientation determination decision process to determine the orientation of the input image, an image orientation determination process for calculating orientation similarity indicative of the degree of similarity between the image features of the input image and image features stored in orientation-specific features storage means for storing the image features in relation to the orientation of the positive training image, and, when the calculated orientation similarity satisfies a predetermined condition, determining the orientation of the input image in accordance with the orientation of the positive training image related to the image features stored in the orientation-specific features storage means.

Advantageous Effects of the Invention

The present invention makes it possible to reduce the possibility of erroneously determining the image orientation.

BRIEF DESCRIPTION OF DRAWINGS

FIG. 10 It depicts image examples that are prone to determination error.

DESCRIPTION OF EMBODIMENTS

Embodiments of the present invention will now be described with reference to the accompanying drawings.

First Embodiment

Figure 1:
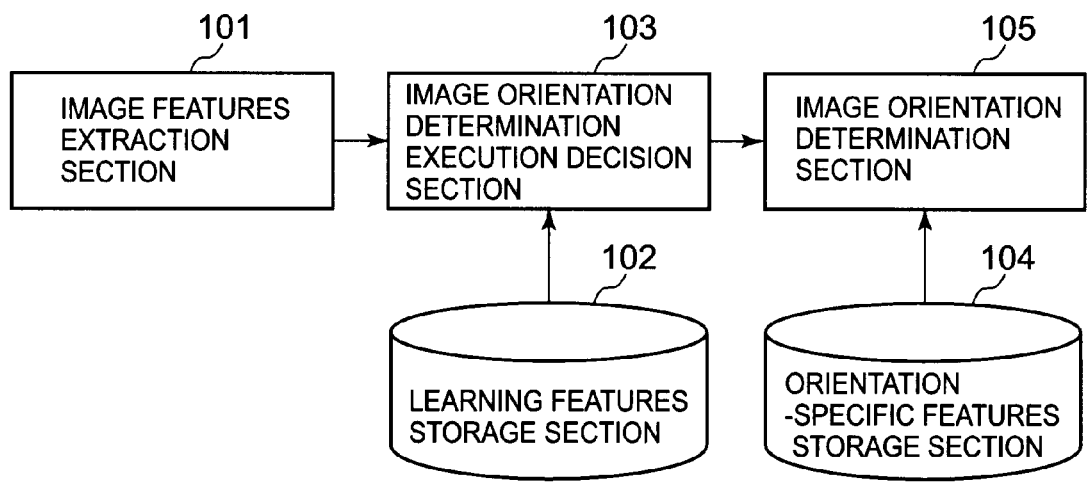
FIG. 1 It depicts a block diagram illustrating an example of an image orientation determination device according to a first exemplary embodiment of the present invention.

FIG. 1 is a block diagram illustrating an example of an image orientation determination device according to a first exemplary embodiment of the present invention. The image orientation determination device according to the present invention includes an image features extraction section 101, a learning features storage section 102, an image orientation determination execution decision section 103, an orientation-specific features storage section 104, and an image orientation determination section 105.

The image features extraction section 101 extracts features concerning an image composition (layout) (hereinafter referred to as the image features) from an input image targeted for the determination of image orientation (hereinafter referred to as image orientation determination). The image features concerns features that are derived from the disposition of color and density values of image pixels. For example, the distribution of image edges and colors may be used as the information about image layout. However, the features covered by the image features are not limited to those mentioned above. Further, the image features may be referred to as visual features because it indicates the degree of visually recognizable features.

When, for instance, the image orientation determination device includes an image reader (not shown), which reads an image, the image features extraction section 101 may read an image from the image reader and use the read image as an input image. Further, if, for instance, the image reader can acquire an image from a CCD (Charge Coupled Device)

digital camera, video camera, or other video input device, the image features extraction section 101 may use the acquired image as the input image.

The learning features storage section 102 stores the image features of an image that is to be compared against the input image for image orientation determination purposes. The image to be compared against the input image is hereinafter referred to as the training image. The training image includes an image having a composition appropriate for image orientation determination (hereinafter referred to as the positive training image) and an image having a composition inappropriate for image orientation determination (hereinafter referred to as the negative training image). In the subsequent description, the image features of the positive training image is referred to as the positive training data, whereas the image features of the negative training image is referred to as the negative training data.

More specifically, the learning features storage section 102 may store the features of an image appropriate for image orientation determination as the positive training data. Alternatively, the learning features storage section 102 may store the features of an image inappropriate for image orientation determination as the negative training data. Another alternative is to let the learning features storage section 102 store the features of an image appropriate for image orientation determination and the features of an image inappropriate for image orientation determination as the positive training data and negative training data, respectively.

A typical image composition appropriate for image orientation determination would be derived from an image showing a combination of the sky and plants, a combination of the sky and water surface (e.g., the surface of the sea, river, or lake), a combination of the sky and flowers, a combination of the sky and snow surface, or the sky at sunset. When these landscapes are shot, their distant views are often picked up. Therefore, the resultant image compositions are frequently based on an image with the sky in the upper part and plants, water surface, flowers, or snow surface that are present on the ground in the lower part. It can be said that these image compositions are appropriate for image orientation determination based on the positional relationship between imaged subjects. It should be noted that the image compositions appropriate for image orientation determination are not limited to those mentioned above.

Meanwhile, a typical image composition inappropriate for image orientation determination would be derived from a close-up image that is obtained by shooting an object in macro mode (short-distance view mode). In such a close-up image, it is difficult to obtain information for image orientation determination because its image area is entirely occupied by a subject or the position of the subject in the image area is not stable. Therefore, when an attempt is made to determine the image orientation by using the above-described image composition, it is likely that an erroneous determination result will be obtained. Consequently, it can be said that the above-described image composition is inappropriate for image orientation determination based on the positional relationship between imaged subjects.

The image features stored in the learning features storage section 102 may be image features that is extracted on the basis, for instance, of a training image prepared by the image features extraction section 101. For example, the image features extraction section 101 may extract image features on the basis of a prepared training image and register the extracted image features in the learning features storage section 102. Storing image features in the learning features storage section 102 may be hereinafter referred to as allowing the learning features storage section 102 to learn.

Further, the learning features storage section 102 stores image features that is extracted in relation to each direction of a training image. This storage operation may be completed by storing only the image features in relation to a single image orientation of the training image when (1) the image features can be extracted on an individual block basis after dividing the training image into a plurality of blocks and (2) the image features of each block of the training image represents an image whose image features do not vary with the image direction (an image independent of orientation changes).

It can be said that conditions defined by (1) and (2) above represent conditions where the information about image composition does not exist in local image features and the image composition is indicated by the information about the disposition of the local image features.

The learning features storage section 102 may be a storage medium such as a CD-ROM disk, a DVD-R disk, a hard disk, or a memory. Image features stored in such a storage medium is read by a reader (not shown) such as a CD-ROM drive.

Further, if the image orientation determination device is connected to the Internet (not shown), image features read processing section (not shown) may acquire image features from another storage medium through the Internet. The image features read processing section may be implemented, for instance, by a CPU in the image orientation determination device that operates in accordance, for example, with a program (image orientation determination program). For example, the program may be stored in storage means (not shown) in the image orientation determination device to let the CPU read the program and operate as the image features read processing section in accordance with the program.

Image features may be stored together in the above-mentioned storage medium or in another storage medium that is accessible through the Internet or separately stored in a plurality of storage media.

The image orientation determination execution decision section 103 calculates the degree of similarity (hereinafter referred to as the similarity) between the image features of an input image, which is extracted by the image features extraction section 101, and image features stored in the learning features storage section 102. The image orientation determination execution decision section 103 then decides, in accordance with the calculated similarity, whether or not to determine the image orientation of the input image.

The similarity may be calculated by calculating an orientation-specific features of a large number of images and deriving data from the calculated features by using an identification engine such as an SVM (Support Vector Machine). For example, the image orientation determination execution decision section 103 may derive an identification boundary by using an SVM. If the features exist in a space that is determined to be similar, the calculated similarity may increase with an increase in the distance from the derived identification boundary.

Alternatively, the image orientation determination execution decision section 103 may vectorize the information about elements of image features stored in the learning features storage section 102 and image features for an input image so that the calculated similarity increases with a decrease in the distance between the vectors. For example, the color feature (dominant color and color layout), pattern feature (edge histogram), and shape feature (region-based shape descriptor) of a visual descriptor defined by MPEG (Moving Picture Experts Group)-7/Visual may be used as the elements for vectorization. More specifically, a combination of features indicative of the above features may be defined as a features vector. The similarity can be calculated, for instance, by the above-described methods. However, the similarity calculation method is not limited to those described above.

When the image features stored in the learning features storage section 102 is positive training data, it can be said that the appropriateness for image orientation determination increases with an increase in the similarity. When, in contrast, the image features stored in the learning features storage section 102 is negative training data, it can be said that the inappropriateness for image orientation determination increases with an increase in the similarity. Therefore, in a situation where the image features stored in the learning features storage section 102 is positive training data, the image orientation determination execution decision section 103 decides to determine the image orientation when the similarity is greater than a predetermined value (hereinafter referred to as the positive image threshold value), and decides not to determine the image orientation when the similarity is not greater than the positive image threshold value. In contrast, in a situation where the image features stored in the learning features storage section 102 is negative training data, the image orientation determination execution decision section 103 decides to determine the image orientation when the similarity is smaller than a predetermined value (hereinafter referred to as the negative image threshold value), and decides not to determine the image orientation when the similarity is not smaller than the negative image threshold value.

In some cases, the positive training data and negative training data are both stored in the learning features storage section 102. In such cases, a decision can be made to determine the image orientation when the similarity to the positive training data is higher than the positive image threshold value, and a decision can be made not to determine the image orientation when the similarity to the negative training data is not lower than the predetermined negative image threshold value. Meanwhile, it is conceivable that the similarity to the positive training data may be contrary to the similarity to the negative training data. However, when the similarity to the negative training data is low, the similarity to the positive training data is not always high. It is therefore preferred that whether or not to determine the image orientation be determined not only by comparing the similarity to the negative training data against the negative image threshold value and comparing the similarity to the positive training data against the positive image threshold value, but also by comparing the similarity (ratio) between the positive and negative training data. In this instance, the positive and negative training data are compared to make a relative determination in contrast to a case where a comparison is made merely against a predetermined value (e.g., positive image threshold value or negative image threshold value). Consequently, whether or not to determine the image orientation can be determined with increased accuracy.

As such being the case, even if the similarity to the negative training data is higher than the negative image threshold value, the image orientation determination execution decision section 103 decides to determine the image orientation as far as the difference or ratio between the similarity to the negative training data and the similarity to the positive training data is not lower than a predetermined value (hereinafter referred to as the positive/negative difference determination value). If, for instance, the similarity to the positive training data is A and the similarity to the negative training data is B, the image orientation determination execution decision section 103 may decide to determine the image orientation as far as the ratio calculated by dividing the value A by the value B is not lower than a predetermined similarity value.

In a situation where image features extracted in relation to each direction of a certain image is stored in the learning features storage section 102, the image orientation determination execution decision section 103 can calculate the similarity from the image features of an input image, which is extracted by the image features extraction section 101, and the image features in relation to each direction, which is stored in the learning features storage section 102.

In contrast, only the image features for a predetermined image orientation of a certain image is stored in the learning features storage section 102 in some cases. In such cases, the image orientation determination execution decision section 103 can calculate the similarity by preparing the image features for another orientation from the image features of an input image or the image features for a predetermined training image orientation.

Figure 2:
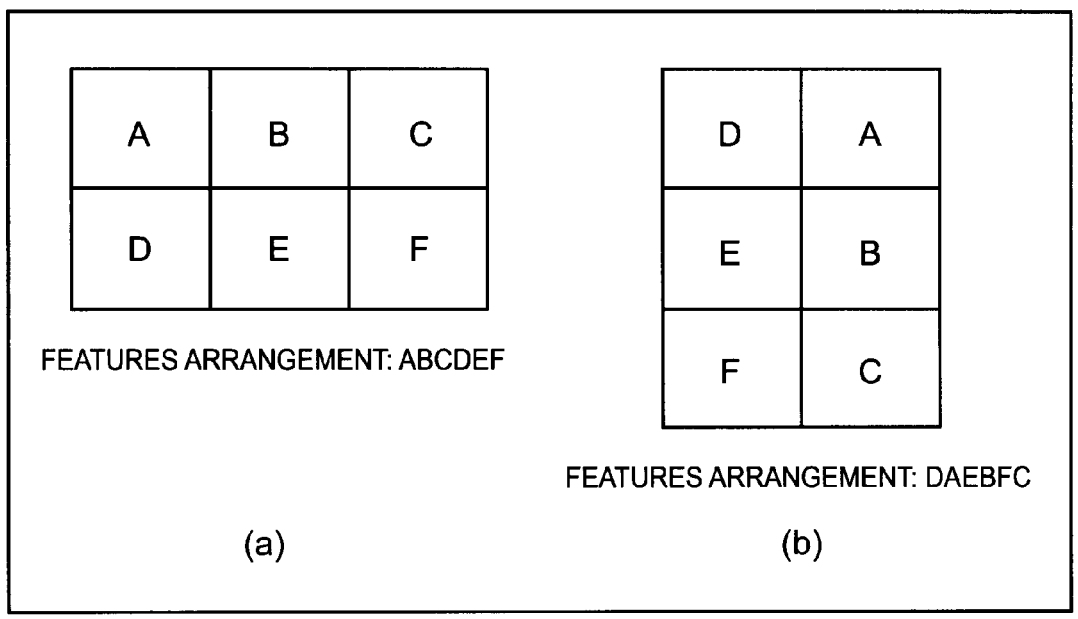
FIG. 2 It depicts diagrams illustrating examples in which image process is divided into blocks of two rows and three columns.

An example method of preparing the image features for another orientation is described in detail below. FIGS. 2(a) and (b) are diagrams illustrating examples in which the image features of an image is divided into blocks of two rows and three columns. When the image features derived from division are arranged in proper orientation (hereinafter referred to as 0 degree orientation), the order of image features arrangement is "ABCDEF" from upper left to lower right (see FIG. 2(a)). When the image is rotated 90 degrees clockwise (an image rotated N degrees clockwise is hereinafter referred to as an N degree oriented image), the order of image features arrangement is "DAEBFC" from upper left to lower right. The resulting image features can be regarded as the image features of a 90 degree oriented image (see FIG. 2(b)). Image features for a different orientation can be prepared in a pseudo manner by dividing the image features for a 0 degree oriented image into a plurality of blocks and rearranging the image features of the individual blocks as described above. When image features for a different orientation are prepared as described above, the similarity to a training image can be determined irrespective of the orientation of an input image.

The orientation-specific features storage section 104 stores the image features of a positive training image in the learning features storage section 102 for each orientation to be determined. In the subsequent description, it is assumed that orientations of 0, 90, 180, and 270 degrees are stored for determination purposes. However, the orientations to be stored are not limited to those mentioned above. The orientation-specific features storage section 104 stores the image features of an image having a known image orientation in relation to the image orientation.

The orientation-specific features storage section 104 may be a storage medium such as a CD-ROM disk, a DVD-R disk, a hard disk, or a memory. Image orientations and image features stored in such a storage medium are read by a reader (not shown) such as a CD-ROM drive. The image orientations and image features may be stored together in the above-mentioned storage medium or separately stored in a plurality of storage media.

The image orientation determination section 105 calculates the degree of similarity between image features extracted by the image features extraction section 101 and an image-orientation-specific image features stored in the orientation-specific features storage section 104. In accordance with the image-orientation-specific similarity, the image orientation determination section 105 determines the image orientation of an input image and determines the orientation of an image. For example, the method of determining the image orientation would be to determine the orientation of the most similar image as a correct image orientation.

When the image orientation determination execution decision section 103 decides not to determine the image orientation, the image orientation determination section 105 concludes that the image orientation is an "indefinite orientation." The following description relates to a process that is performed when the image orientation determination execution decision section 103 decides not to determine the image orientation and allows the image orientation determination section 105 to conclude that the image orientation is an "indefinite orientation."

The image features extraction section 101, the image orientation determination execution decision section 103, and the image orientation determination section 105 are implemented, for instance, by the CPU in the image orientation determination device that operates in accordance with a program (image orientation determination program). For example, the program may be stored in storage means (not shown) in the image orientation determination device to let the CPU read the program and operate as the image features extraction section 101, the image orientation determination execution decision section 103, and the image orientation determination section 105 in accordance with the program.

Figure 3:
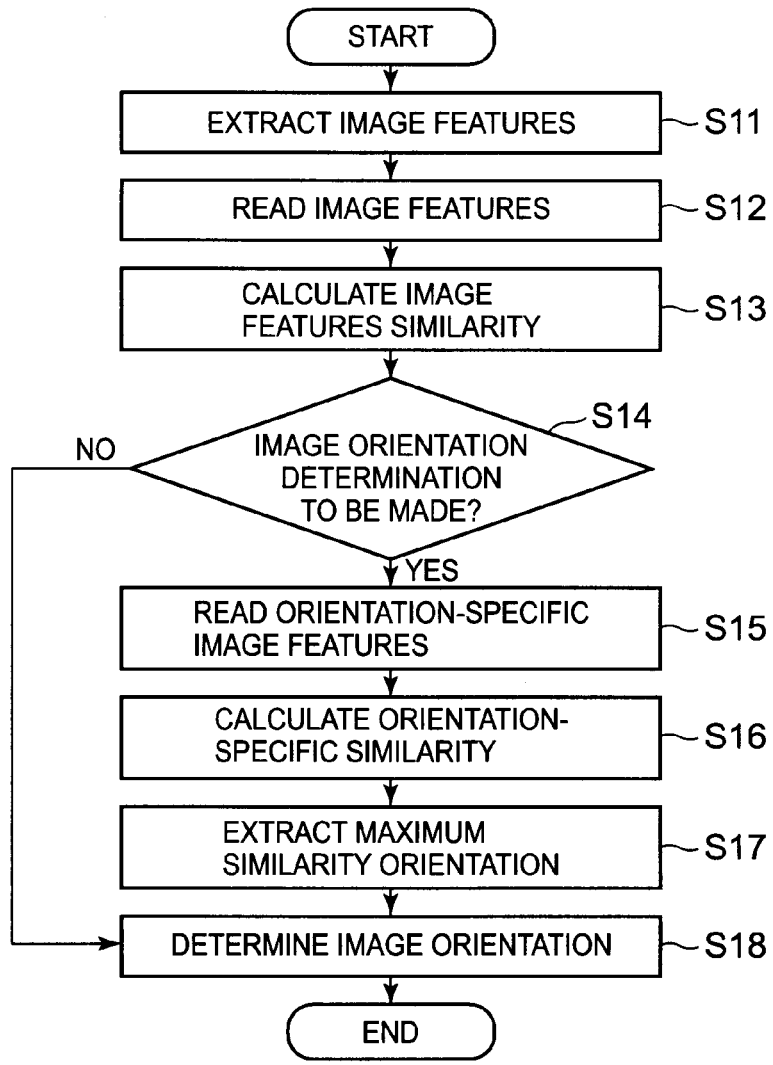
FIG. 3 It depicts a flowchart illustrating an example of an image orientation determination process according to the first exemplary embodiment of the present invention.

An operation will now be described. FIG. 3 is a flowchart illustrating an example of an image orientation determination process according to the first exemplary embodiment of the present invention. The image features extraction section 101 extracts image features indicative of an image composition (spatial disposition of colors and patterns) in accordance with an input image that is shot, for instance, by an imaging device such as a digital camera or CCD camera (step S11).

Image features extraction may be accomplished, for instance, by dividing an image into a plurality of blocks and extracting the image features of each block. For example, the color feature (dominant color and color layout), pattern feature (edge histogram), and shape feature (region-based shape descriptor) of a visual descriptor defined by MPEG (Moving Picture Experts Group)-7/Visual may be used as the elements of image features. In other words, a combination of features indicative of the above features may be used as image features. Further, a combination of these features can be defined as a features vector.

The image orientation determination execution decision section 103 reads the image features of a training image that is stored in the learning features storage section 102 (step S12). The image orientation determination execution decision section 103 uses, for instance, a CD-ROM drive (not shown) or other reader to read the image features from one medium or a plurality of media depending on the configuration of the learning features storage section 102. If the image orientation determination device is connected to the Internet with the learning features storage section 102 connected to the Internet, the image orientation determination execution decision section 103 may acquire the image features through the Internet.

The image orientation determination execution decision section 103 calculates image features similarity from the image features of the input image that is extracted in step S11 by the image features extraction section 101 and the image features of the training image that is read in step S12 by the image orientation determination execution decision section 103 (step S13). When image features for a plurality of training image orientations are stored in the learning features storage section 102, the image orientation determination execution decision section 103 calculates the similarity between the image features for all such orientations and the image features of the input image. In some cases, however, only the image features for a particular image orientation of a certain image is stored in the learning features storage section 102. In such cases, the image orientation determination execution decision section 103 can calculate the similarity by preparing the image features for another orientation in a pseudo manner through the use of image features stored in the learning features storage section 102 or the image features of the input image.

When the image features stored in the learning features storage section 102 is positive training data, the image orientation determination execution decision section 103 defines the highest degree of similarity as "similarity." When, in contrast, the image features stored in the learning features storage section 102 is negative training data, the image orientation determination execution decision section 103 defines the highest degree of similarity as "inappropriate similarity." If the positive and negative training data are both stored, the image orientation determination execution decision section 103 outputs both "similarity" and "inappropriate similarity."

In accordance with the "similarity" and "inappropriate similarity" defined in step S13, the image orientation determination execution decision section 103 decides whether or not to determine the image orientation for the input image. If the "similarity" is greater than the positive image threshold value, if the "inappropriate similarity" is smaller than the negative image threshold value, or if the "similarity" is sufficiently greater than the "inappropriate similarity" (i.e., not smaller than the positive/negative difference determination value), the image orientation determination execution decision section 103 decides to determine the image orientation. If, in contrast, the similarity is not greater than the threshold value, the inappropriate similarity is not smaller than the threshold value, and the "similarity" is not sufficiently greater than the "inappropriate similarity," the image orientation determination execution decision section 103 decides not to determine the image orientation.

If the image orientation determination execution decision section 103 has decided to determine the image orientation (if the query in step S14 is answered "YES"), the image orientation determination section 105 reads an image-orientation-specific image features stored in the orientation-specific features storage section 104 (step S15). The image orientation determination execution decision section 103 uses, for instance, a CD-ROM drive (not shown) or other reader to read the image features from one medium or a plurality of media depending on the configuration of the orientation-specific features storage section 104. If the image orientation determination device is connected to the Internet with the orientation-specific features storage section 104 connected to the Internet, the image orientation determination execution decision section 103 may acquire the image features through the Internet.

The image orientation determination section 105 calculates the similarity from the image-orientation-specific image features, which is read from the orientation-specific features storage section 104, and the image features for the input image (step S16).

For similarity calculation, data derived through the use of an identification engine such as an SVM may be used for features such as Color Moment and Edge Direction Histogram, for each orientation of a large number of images. In this instance, the image orientation determination section 105 may calculate the degree of features agreement between the data and the features constituting the image features of the input image, and the degree of calculated similarity increases with an increase in the degree of features agreement (refer to Non-Patent Document 1). For example, the image orientation determination section 105 may derive an identification boundary by using an SVM. If these features exist in a space that is determined to be similar, the calculated similarity may increase with an increase in the distance from the derived identification boundary.

Alternatively, the image orientation determination section 105 may output the degree of similarity between image features (e.g., edge and color distribution information) registered for each image orientation and the image features of the input image as a value indicative of certainty of each orientation.

Further alternatively, the image orientation determination section 105 may vectorize the information about elements of image features stored in the orientation-specific features storage section 104 and image features for the input image, and the calculated similarity increases with a decrease in the distance between the vectors. For example, the color feature (dominant color and color layout), pattern feature (edge histogram), and shape feature (region-based shape descriptor) of a visual descriptor defined by MPEG (Moving Picture Experts Group)-7/Visual may be used as the elements for vectorization. More specifically, a combination of features indicative of the above features may be defined as a features vector.

As described above, the image orientation determination section 105 is capable of calculating the similarity between the image features extracted from the input image and the image features of preregistered image data and calculating the maximum similarity concerning each orientation of a registered image. However, the similarity calculation method is not limited to those described above.

The image orientation determination section 105 notes the calculated degrees of similarity and extracts the orientation of the most similar image (step S17). The image orientation determination section 105 determines the image orientation determined and extracted in step S17 as a predetermined image orientation (step S18). If, in contrast, the image orientation determination execution decision section 103 has decided not to determine the image orientation for the input image in step S14 (if the query in step S14 is answered "NO"), the image orientation determination section 105 concludes that the predetermined image orientation is an "indefinite orientation." If, for instance, the image orientation determination device includes an output section (not shown), the image orientation determination section 105 may output such a conclusion to the output section.

According to the present invention, the image orientation determination device extracts image features from an input image and calculates the similarity between the extracted image features and image features stored in the learning features storage section 102. If the calculated similarity is higher than the positive image threshold value, the image orientation determination device decides to determine the orientation of the input image. If, in contrast, the calculated similarity is higher than the negative image threshold value, the image orientation determination device decides not to determine the orientation of the input image. When a decision is made to determine the orientation of the input image, the image orientation determination device calculates the similarity between image features stored in the orientation-specific features storage section 104 and the image features of the input image, and determines the orientation of the input image in accordance with the orientation of a positive training image related to a case where the calculated similarity represents the highest degree of similarity. This makes it possible to reduce the possibility of erroneously determining the image orientation without using a semantic rule applicable to special targets only. Further, when an image inappropriate for image orientation determination (i.e., a negative training image) is input, the possibility of erroneously determining the image orientation can be reduced by refraining from determining the image orientation.

Second Embodiment

Figure 4:
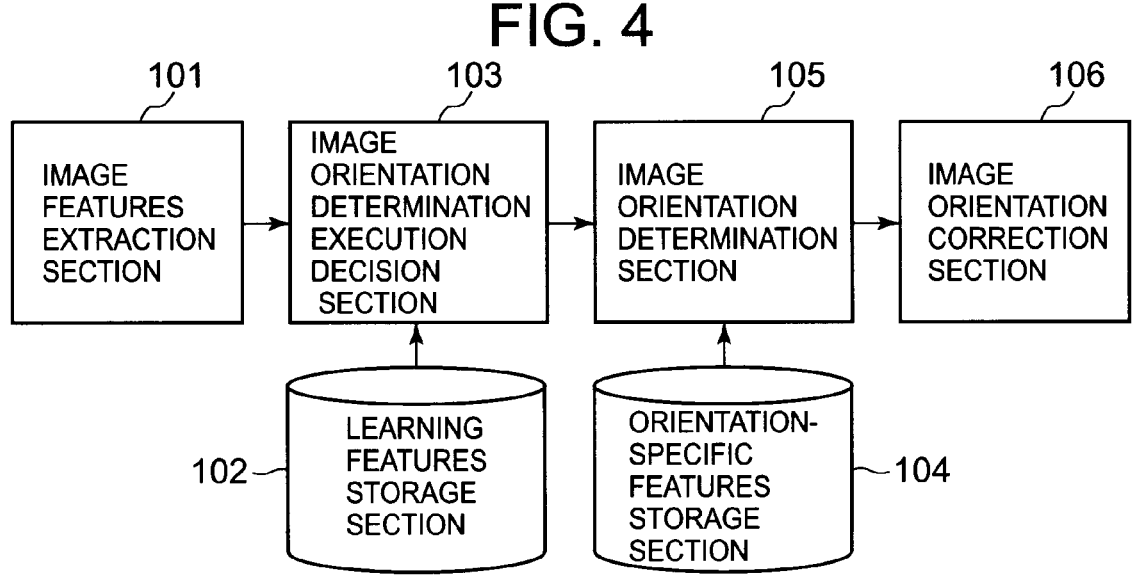
FIG. 4 It depicts a block diagram illustrating an example of the image orientation determination device according to a second exemplary embodiment of the present invention.

FIG. 4 is a block diagram illustrating an example of the image orientation determination device according to a second exemplary embodiment of the present invention. Elements identical with those of the first exemplary embodiment are designated by the same reference numerals as in FIG. 1 and will not be redundantly described. The image orientation determination device according to the second exemplary embodiment includes an image orientation correction section 106 in addition to the image features extraction section 101, learning features storage section 102, image orientation determination execution decision section 103, orientation-specific features storage section 104, and image orientation determination section 105 shown in FIG. 1.

The image orientation correction section 106 corrects the orientation of an input image by using an image orientation that is predetermined by the image orientation determination section 105. If, for instance, the image orientation determination device includes an output section (not shown), the image orientation correction section 106 may output the corrected input image to the output section.

If, for instance, the image orientation determination section 105 concludes that the orientation of the input image is the orientation of a "0 degree oriented image" or an "indefinite orientation," the image orientation correction section 106 does not correct the orientation of the input image. If, in contrast, the image orientation determination section 105 concludes that the orientation of the input image is the orientation of a "90 degree oriented image," the image orientation correction section 106 corrects the orientation of the input image by rotating it 270 degrees clockwise. Similarly, if the image orientation determination section 105 concludes that the orientation of the input image is the orientation of a "180 degree oriented image," the image orientation correction section 106 corrects the orientation of the input image by rotating it 180 degrees clockwise. Further, if the image orientation determination section 105 concludes that the orientation of the input image is the orientation of a "270 degree oriented image," the image orientation correction section 106 corrects the orientation of the input image by rotating it 90 degrees clockwise. If, for instance, the image orientation determination device includes an output section (not shown), the image orientation correction section 106 may output the corrected input image to the output section.

The image features extraction section 101, the image orientation determination execution decision section 103, the image orientation determination section 105, and the image orientation correction section 106 are implemented, for instance, by the CPU in the image orientation determination device that operates in accordance with a program (image orientation determination program). For example, the program may be stored in storage means (not shown) in the image orientation determination device to let the CPU read the program and operate as the image features extraction section 101, the image orientation determination execution decision section 103, the image orientation determination section 105, and the image orientation correction section 106 in accordance with the program.

Figure 5:
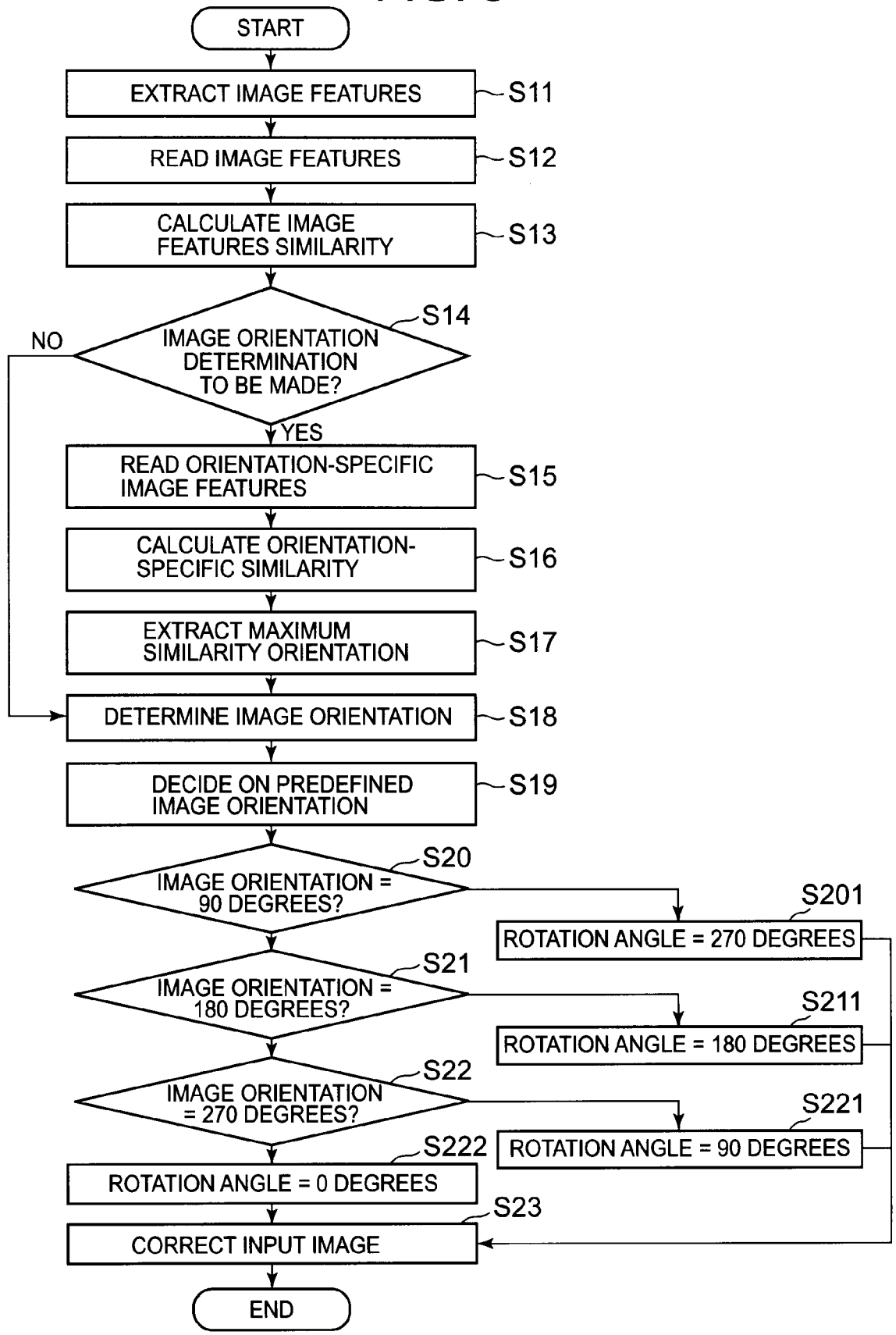
FIG. 5 It depicts a flowchart illustrating an example of the image orientation determination process according to the second exemplary embodiment of the present invention.

An operation will now be described. FIG. 5 is a flowchart illustrating an example of the image orientation determination process according to the second exemplary embodiment of the present invention. Steps (steps S11 to S18) performed to extract the image features of an input image and eventually determine the image orientation, which are indicated in the example shown in FIG. 3, are the same as described in connection with the first exemplary embodiment. In the subsequent description, it is assumed that a predefined image orientation to be determined by the image orientation determination section 105 is the orientation of a "0 degree oriented image," the orientation of a "90 degree oriented image," the orientation of a "180 degree oriented image," the orientation of a "270 degree oriented image," or an "indefinite orientation." However, the predefined image orientation to be determined by the image orientation determination section 105 is not limited to those mentioned above.

When the image orientation determination section 105 decides on one of the predefined image orientations (step S19), the image orientation correction section 106 determines whether the image orientation is the orientation of a "90 degree oriented image" (step S20).

If the image orientation is the orientation of a "90 degree oriented image" (if the query in step S20 is answered "YES"), the image orientation correction section 106 decides on a correction angle of "270 degrees" (step S201). If, in contrast, the image orientation is not the orientation of a "90 degree oriented image" (if the query in step S20 is answered "NO"), the image orientation correction section 106 determines whether the image orientation is the orientation of a "180 degree oriented image" (step S21).

If the image orientation is the orientation of a "180 degree oriented image" (if the query in step S21 is answered "YES"), the image orientation correction section 106 decides on a correction angle of "180 degrees" (step S211). If, in contrast, the image orientation is not the orientation of a "180 degree oriented image" (if the query in step S21 is answered "NO"), the image orientation correction section 106 determines whether the image orientation is the orientation of a "270 degree oriented image" (step S22).

If the image orientation is the orientation of a "270 degree oriented image" (if the query in step S22 is answered "YES"), the image orientation correction section 106 decides on a correction angle of "90 degrees" (step S221). If, in contrast, the image orientation is not the orientation of a "270 degree oriented image" (if the query in step S22 is answered "NO"), the image orientation correction section 106 decides on a correction angle of "0 degrees" (step S222).

In the present exemplary embodiment, it is assumed that the image orientation to be determined by the image orientation determination section 105 is "0 degrees," "90 degrees," "180 degrees," or "270 degrees." However, the image orientation to be determined by the image orientation determination section 105 is not limited to those mentioned above. When, for instance, the image orientation determined by the image orientation determination section 105 is X degrees, the image orientation correction section 106 can decide on a correction angle of "(360−X) degrees."

Figure 6:
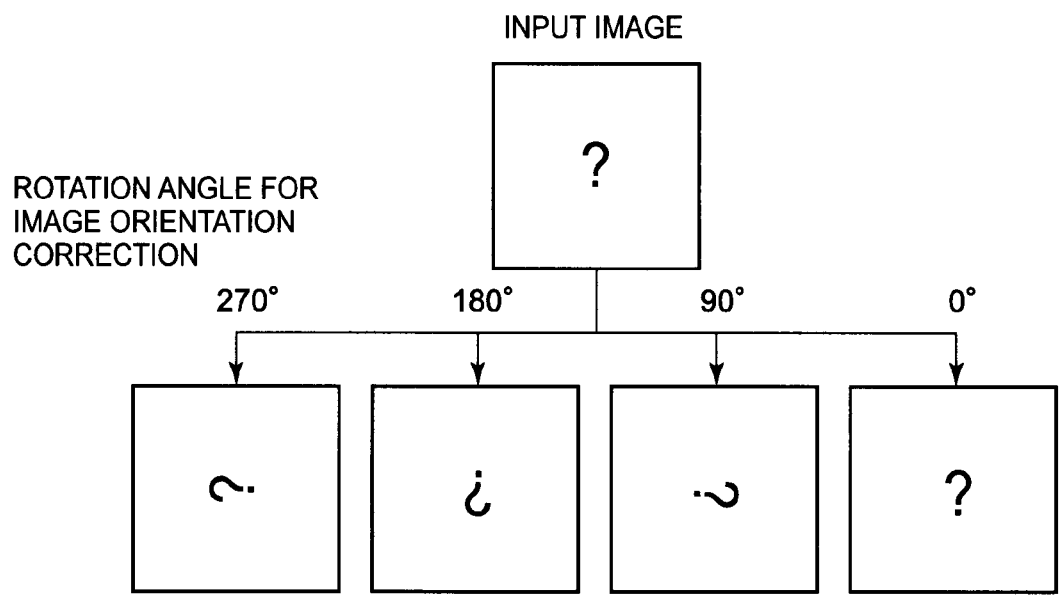
FIG. 6 It depicts a diagram illustrating an exemplary relationship between input image corrections and correction angles.

FIG. 6 is a diagram illustrating an exemplary relationship between input image corrections and correction angles. When the correction angle is determined, the image orientation correction section 106 corrects the input image in accordance with the correction angle (step S23).

The present invention not only produces the advantageous effect described in connection with the first exemplary embodiment, but also corrects the orientation of an input image in accordance with a determined image orientation. This makes it possible to avoid the degradation of image viewability.

Third Embodiment

Figure 7:
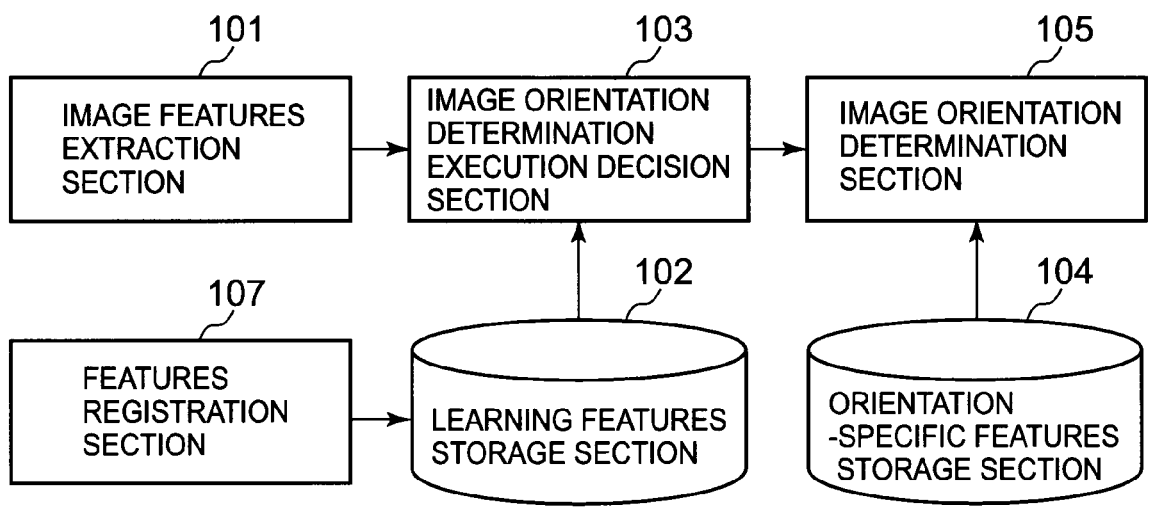
FIG. 7 It depicts a block diagram illustrating an example of the image orientation determination device according to a third exemplary embodiment of the present invention.

FIG. 7 is a block diagram illustrating an example of the image orientation determination device according to a third exemplary embodiment of the present invention. Elements identical with those of the first exemplary embodiment are designated by the same reference numerals as in FIG. 1 and will not be redundantly described. The image orientation determination device according to the third exemplary embodiment includes a features registration section 107 in addition to the image features extraction section 101, learning features storage section 102, image orientation determination execution decision section 103, orientation-specific features storage section 104, and image orientation determination section 105 shown in FIG. 1.

When the image orientation determined by the image orientation determination section 105 is found to be erroneously determined, the features registration section 107 registers the image features of the erroneously determined image in the learning features storage section 102 as negative training data. When, for instance, the orientation of an input image is determined by the image orientation determination section 105 in accordance with an image having a known image orientation and the determination result does not agree with the orientation of the input image, it is said that an "erroneous determination" is made. The "erroneously determined image" denotes an input image whose image orientation does not agree with the image orientation determined by the image orientation determination section 105.

If, for instance, the orientation of an input image is given beforehand, the features registration section 107 may compare the determined orientation against the given image orientation to detect an erroneous determination. If the image orientation determination device includes an input device (not shown), the features registration section 107 may detect an erroneous determination when, for instance, a user of the image orientation determination device enters information through the input device to indicate that an erroneous determination is made (e.g., the determination result does not agree with the orientation of the input image). Alternatively, the features registration section 107 may detect an erroneous determination when it finds that the user of the image orientation determination device has corrected a determined image through the input device. The detection method is not limited to those described above.

The image features extraction section 101, the image orientation determination execution decision section 103, the image orientation determination section 105, and the features registration section 107 are implemented, for instance, by the CPU in the image orientation determination device that operates in accordance with a program (image orientation determination program). For example, the program may be stored in storage means (not shown) in the image orientation determination device to let the CPU read the program and operate as the image features extraction section 101, the image orientation determination execution decision section 103, the image orientation determination section 105, and the features registration section 107 in accordance with the program.

The present invention not only produces the advantageous effect described in connection with the first exemplary embodiment, but also allows the image orientation determination device to detect any inadequately determined image orientation. When such an inadequate image orientation is detected, image features related to the orientation of a positive training image used to determine the orientation of the input image is registered in the learning features storage section 102 as the image features of a negative training image. This increases the accuracy of determining whether or not to determine the image orientation of the input image.

A modification of the third exemplary embodiment will now be described. In the third exemplary embodiment, the features registration section 107 registers the image features of an image erroneously determined by the image orientation determination section 105 in the learning features storage section 102 as negative training data. Further, the features registration section 107 may calculate the difference between the similarity of the orientation of the erroneously determined image and the similarity of an orientation different from the image orientation. If the calculated similarity difference is not greater than a predetermined value (hereinafter referred to as features addition determination value), the image may be handled as a negative training image to newly add its image features. If, for instance, in a situation where an erroneous determination is made by the image orientation determination section 105, the difference between the similarity of the orientation of a determined image (i.e., the orientation of an erroneously determined image) and the second highest similarity of the orientation of a different image is not greater than the features addition determination value, the different image may be handled as a negative training image to add new image features.

A detailed description is given below by using a concrete example. For example, if, in a targeted input image, the difference between the highest similarity (e.g., a 90 degree oriented image) and the second highest similarity (a 180 degree oriented image) is not greater than the features addition determination value, it is highly likely that the angle may change from 90 degrees to 180 degrees due, for instance, to noise during determination. Therefore, it is highly probable that inconsistent results will be obtained. As such being the case, such an input image and an image similar to it (an image having the second highest similarity in the present example) should not be subjected to orientation determination.

Consequently, when such an input image and an image similar to it are registered as negative training images, the possibility of producing inconsistent determination results, that is, making erroneous determination s can be reduced.

Figure 8:
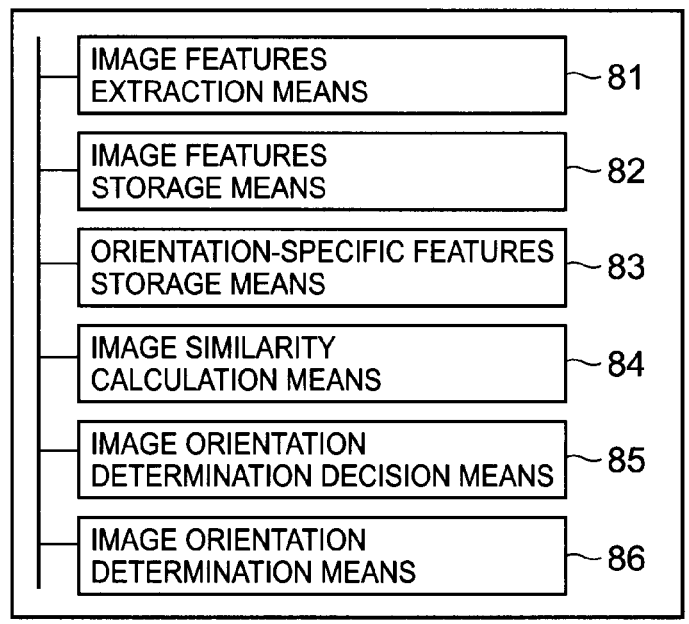
FIG. 8 It depicts a block diagram illustrating an overview of the image orientation determination device according to the present invention.
Figure 9:
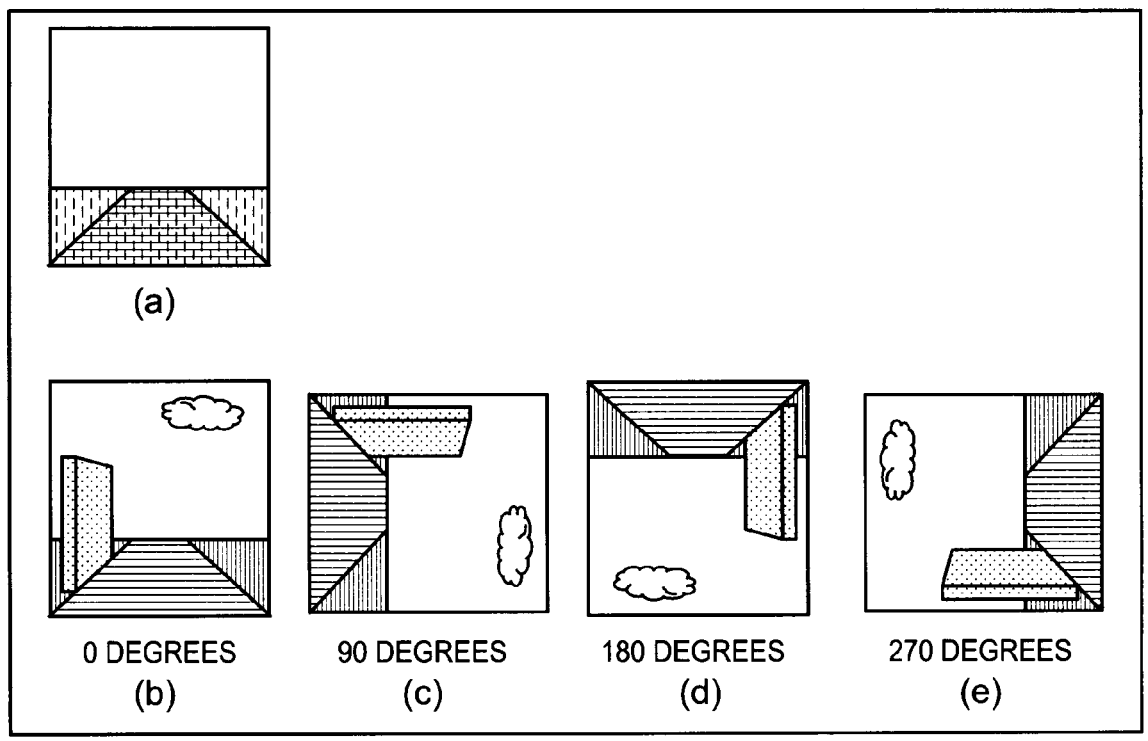
FIG. 9 It depicts image examples that are not prone to determination error.

FIG. 8 is a block diagram illustrating an overview of the image orientation determination device according to the present invention. The image orientation determination device according to the present invention includes: image features extraction means 81 (e.g., the image features extraction section 101) for extracting from an input image, image features indicative of a disposition feature of each element included in an image (e.g., features concerning an image composition (layout)); image features storage means 82 (e.g., the learning features storage section 102) for storing the image features of a positive training image (e.g., positive training data), which is an image appropriate for image orientation determination, and the image features of a negative training image (e.g., negative training data), which is an image inappropriate for image orientation determination; orientation-specific features storage means 83 (e.g., the orientation-specific features storage section 104) for storing the orientation of a positive training image in relation to image features; image similarity calculation means 84 (the image orientation determination execution decision section 103) for calculating training image similarity, which indicates the degree of similarity between the image features of the input image that is extracted by the image features extraction means 81 and the image features of the positive training image and negative training image that are stored in the image features storage means 82; image orientation determination decision means 85 (e.g., the image orientation determination execution decision section 103) for deciding to determine the orientation of the input image when positive image similarity (e.g., the "similarity"), which is the degree of training image similarity between the image features of the input image and the image features of the positive training image, is higher than a predetermined first threshold value (e.g., the positive image threshold value), and deciding not to determine the orientation of the input image when negative image similarity (e.g., the "inappropriate similarity"), which is the degree of training image similarity between the image features of the input image and the image features of the negative training image, is not lower than a predetermined second threshold value (e.g., the negative image threshold value); and image orientation determination means 86 (e.g., image orientation determination section 105) for, when the image orientation determination decision means 85 has decided to determine the orientation of the input image, calculating orientation similarity indicative of the degree of similarity between the image features of the input image and the image features stored in the orientation-specific features storage means 83, and determining the orientation of the input image in accordance with the orientation of the positive training image related to the image features stored in the orientation-specific features storage means 83 when the calculated orientation similarity satisfies a predetermined condition (e.g., the highest similarity).

The above-described configuration makes it possible to reduce the possibility of erroneously determining the image orientation.

A configuration disclosed by a foregoing exemplary embodiment includes image orientation correction means (e.g., the image orientation correction section 106) for correcting the orientation of an input image in accordance with an image orientation determined by the image orientation determination means 86.

The above-described configuration makes it possible to avoid the degradation of image viewability.

When the predetermined condition is satisfied as the image-orientation-specific similarity of image features represents the highest degree of similarity, the image orientation determination means 86 may determine the orientation of the input image in accordance with the orientation of a positive training image related to image features stored in the orientation-specific features storage means 83.

The image features storage means 82 may store the image features of the positive training image and negative training image related to an orientation in a predetermined direction, and the image similarity calculation means 84 may calculate image features related to an orientation in a different direction in accordance with the image features to calculate the degree of training image similarity.

A configuration disclosed by a foregoing exemplary embodiment includes detection means (e.g., the features registration section 107) for detecting that the image orientation determined by the image orientation determination means 86 is different from the actual orientation of an input image; and negative image information registration means (e.g., the features registration section 107) for, when the detection means detects that the orientation of the input image is different from the image orientation determined by the image orientation determination means 86, registering image features related to the orientation of a positive training image used for input image orientation determination by the image orientation determination means 86 in the image features storage means 82 as the image features of a negative training image.

The above-described configuration makes it possible to increase the accuracy of determining whether or not to determine the image orientation of an input image.

The negative image information registration means may calculate the difference between the orientation similarity of image features related to the orientation of a positive training image used for input image orientation determination by the image orientation determination means 86 and the orientation similarity of image features for an orientation different from the image orientation. When the calculated orientation similarity difference is not greater than a predetermined value (e.g., the features addition determination value), the negative image information registration means may register the image features for the different orientation in the image features storage means as the image features of a negative training image.

Performing the above-described operation makes it possible to reduce the possibility of producing inconsistent determination results, that is, making erroneous determinations.

The image features storage means 82 may store the image features of both a positive training image and a negative training image. The image similarity calculation means 84 may calculate the positive image similarity and negative image similarity. Further, the image orientation determination decision means 85 may decide to determine the orientation of an input image when the negative image similarity is higher than the predetermined second threshold value and the difference or ratio between the positive image similarity and negative image similarity is not smaller than a predetermined value (e.g., the positive/negative difference determination value).

When the above-described operation is performed, the positive and negative training data are compared to make a relative determination in contrast to a case where a comparison is made merely against a predetermined value (e.g., the positive image threshold value or negative image threshold value). This increases the accuracy of determination.

The image features storage means 82 may store the image features of an image having a composition at least showing the sky and plants, the sky and water surface, the sky and flowers, the sky and snow, or the sky at sunset as the image features of a positive training image.

The image features storage means 82 may store image features extracted from an image having a macro composition as the image features of a negative training image.

The orientation-specific features storage means 83 may store the image features of a positive training image, which is stored in the image features storage means 82 together with the other image features, as image features.

The image features storage means 82 may store the image features of a negative training image (e.g., the negative training data), which is an image inappropriate for image orientation determination. In this instance, the image similarity calculation means 84 can calculate training image similarity (e.g., "inappropriate similarity") indicative of the degree of similarity between the image features of an input image that is extracted by the image features extraction means 81 and the image features of a negative training image that is stored in the image features storage means 82. Further, the image orientation determination decision means 85 can decide not to determine the orientation of the input image when the training image similarity between the image features of the input image and the image features of the negative training image is not lower than a predetermined threshold value (e.g., the negative image threshold value), and can decide to determine the orientation of the input image when the training image similarity is lower than the predetermined threshold value.

The image features storage means 82 may store the image features of a positive training image (e.g., the positive training data), which is an image appropriate for image orientation determination. In this instance, the image similarity calculation means 84 can calculate training image similarity (e.g., "similarity") indicative of the degree of similarity between the image features of an input image that is extracted by the image features extraction means 81 and the image features of a positive training image that is stored in the image features storage means 82. Further, the image orientation determination decision means 85 can decide to determine the orientation of the input image when the training image similarity between the image features of the input image and the image features of the positive training image is higher than a predetermined threshold value (e.g., the positive image threshold value).

While the present invention has been described with reference to exemplary embodiments and examples thereof, it will be understood by those skilled in the art that the present invention is not limited to the exemplary embodiments and examples, and that modifications and variations can be made without departing from the spirit and scope of the invention.

This application is based upon and claims the benefit of priority from Japanese Patent Application No. 2008-284979, filed on Nov. 6, 2008, the disclosure of which is incorporated herein in its entirety by reference.

INDUSTRIAL APPLICABILITY

The present invention is preferably applicable to an image orientation determination device for determining the orientation of an image.

REFERENCE SIGNS LIST

101 Image features extraction section
102 Learning features storage section
103 Image orientation determination execution decision section
104 Orientation-specific features storage section
105 Image orientation determination section
106 Image orientation correction section
107 Features registration section

The invention claimed is:

1. An image orientation determination device comprising:
an image features extraction section for extracting from an input image, image features indicative of a disposition feature of each element included in an image;
an image features storage section for storing the image features of a positive training image, which is an image appropriate for image orientation determination, and the image features of a negative training image, which is an image inappropriate for image orientation determination;
an orientation-specific features storage section for storing the orientation of the positive training image in relation to image features;
an image similarity calculation section for calculating training image similarity indicative of the degree of similarity between the image features of the input image that is extracted by the image features extraction section and the image features of the positive training image and negative training image that are stored in the image features storage section;

an image orientation determination decision section for deciding to determine the orientation of the input image when positive image similarity, which is the degree of training image similarity between the image features of the input image and the image features of the positive training image, is higher than a predetermined first threshold value, and deciding not to determine the orientation of the input image when negative image similarity, which is the degree of training image similarity between the image features of the input image and the image features of the negative training image, is not lower than a predetermined second threshold value; and an image orientation determination section for, when the image orientation determination decision section has decided to determine the orientation of the input image, calculating orientation similarity indicative of the degree of similarity between the image features of the input image and the image features stored in the orientation-specific features storage section, and determining the orientation of the input image in accordance with the orientation of the positive training image related to the image features stored in the orientation-specific features storage section when the calculated orientation similarity satisfies a predetermined condition.

2. The image orientation determination device according to claim 1, further comprising:

an image orientation correction section for correcting the orientation of the input image in accordance with the image orientation determined by the image orientation determination section.

3. The image orientation determination device according to claim 1, wherein the image orientation determination section determines the orientation of the input image in accordance with the orientation of the positive training image related to the image features stored in the orientation-specific features storage section when the predetermined condition is satisfied as the image-orientation-specific similarity of image features represents the highest degree of similarity.

4. The image orientation determination device according to claim 1, wherein the image features storage section stores the image features of the positive training image and negative training image related to an orientation in a predetermined direction; and wherein the image similarity calculation section calculates image features related to an orientation in a different direction in accordance with the image features to calculate the degree of training image similarity.

5. The image orientation determination device according to claim 1, further comprising:

a detection section for detecting that the image orientation determined by the image orientation determination section is different from the actual orientation of the input image; and a negative image information registration section for, when the detection section detects that the orientation of the input image is different from the image orientation determined by the image orientation determination section, registering image features related to the orientation of a positive training image used for input image orientation determination by the image orientation determination section in the image features storage section as the image features of the negative training image.

6. The image orientation determination device according to claim 5, wherein the negative image information registration section calculates the difference between the orientation similarity of image features related to the orientation of the positive training image used for input image orientation determination by the image orientation determination section and the orientation similarity of image features for an orientation different from the orientation of the image, and, when the calculated orientation similarity difference is not greater than a predetermined value, registers the image features for the different orientation in the image features storage section as the image features of the negative training image.

7. The image orientation determination device according to claim 1, wherein the image features storage section stores the image features of both the positive training image and the negative training image;

wherein the image similarity calculation section calculates the positive image similarity and the negative image similarity; and wherein the image orientation determination decision section decides to determine the orientation of the input image when the negative image similarity is higher than the predetermined second threshold value and the difference or ratio between the positive image similarity and the negative image similarity is not smaller than a predetermined value.

8. The image orientation determination device according to claim 1, wherein the image features storage section stores the image features of an image having a composition at least showing the sky and plants, the sky and a water surface, the sky and flowers, the sky and snow, or the sky at sunset as the image features of the positive training image.

9. The image orientation determination device according to claim 1, wherein the image features storage section stores the image features extracted from an image having a macro composition as the image features of the negative training image.

10. The image orientation determination device according to claim 1, wherein the orientation-specific features storage section stores the image features of a positive training image, which is stored in the image features storage section together with the other image features, as image features.

11. An image orientation determination device comprising:

an image features extraction section for extracting from an input image, image features indicative of a disposition feature of each element included in an image;

an image features storage section for storing the image features of a negative training image, which is an image inappropriate for image orientation determination;

an orientation-specific features storage section for storing the orientation of a positive training image, which is an image appropriate for image orientation determination, in relation to image features;

an image similarity calculation section for calculating training image similarity indicative of the degree of similarity between the image features of the input image that is extracted by the image features extraction section and the image features of the negative training image that is stored in the image features storage section;

an image orientation determination decision section for deciding not to determine the orientation of the input image when the degree of training image similarity between the image features of the input image and the image features of the negative training image is not lower than a predetermined threshold value, and deciding to determine the orientation of the input image when the degree of training image similarity between the image features of the input image and the image features of the negative training image is lower than the predetermined threshold value; and an image orientation determination section for, when the image orientation determination decision section has decided to determine the orientation of the input image, calculating orientation similarity indicative of the degree of similarity between the image features of the input image and the image features stored in the orientation-specific features storage section, and determining the orientation of the input image in accordance with the orientation of the positive training image related to the image features stored in the orientation-specific features storage section when the calculated orientation similarity satisfies a predetermined condition.

12. An image orientation determination device comprising:

an image features extraction section for extracting from an input image, image features indicative of a disposition feature of each element included in an image;

an image features storage section for storing the image features of a positive training image, which is an image appropriate for image orientation determination;

an orientation-specific features storage section for storing the orientation of the positive training image in relation to image features;

an image similarity calculation section for calculating training image similarity indicative of the degree of similarity between the image features of the input image that is extracted by the image features extraction section and the image features of the positive training image that is stored in the image features storage section;

an image orientation determination decision section for deciding to determine the orientation of the input image when the degree of training image similarity between the image features of the input image and the image features of the positive training image is higher than a predetermined threshold value; and an image orientation determination section for, when the image orientation determination decision section has decided to determine the orientation of the input image, calculating orientation similarity indicative of the degree of similarity between the image features of the input image and the image features stored in the orientation-specific features storage section, and determining the orientation of the input image in accordance with the orientation of the positive training image related to the image features stored in the orientation-specific features storage section when the calculated orientation similarity satisfies a predetermined condition.

13. An image orientation determination method comprising:

extracting from an input image, image features indicative of a disposition feature of each element included in an image;

calculating training image similarity indicative of the degree of similarity between the extracted image features of the input image and image features stored in image features storage section for storing the image features of a positive training image, which is an image appropriate for image orientation determination, and the image features of a negative training image, which is an image inappropriate for image orientation determination;

deciding to determine the orientation of the input image when positive image similarity, which is the degree of training image similarity between the image features of the input image and the image features of the positive training image, is higher than a predetermined first threshold value, and deciding not to determine the orientation of the input image when negative image similarity, which is the degree of training image similarity between the image features of the input image and the image features of the negative training image, is not lower than a predetermined second threshold value; and when a decision is made to determine the orientation of the input image, calculating orientation similarity indicative of the degree of similarity between the image features of the input image and image features stored in orientation-specific features storage section for storing the orientation of the positive training image in relation to image features, and determining the orientation of the input image in accordance with the orientation of the positive training image related to the image features stored in the orientation-specific features storage section when the calculated orientation similarity satisfies a predetermined condition.

14. The image orientation determination method according to claim 13, further comprising:

correcting the orientation of the input image in accordance with the determined orientation of the input image.

15. The image orientation determination method according to claim 13, further comprising:

determining the orientation of the input image in accordance with the orientation of the positive training image related to the image features stored in the orientation-specific features storage section when the predetermined condition is satisfied as the image-orientation-specific similarity of image features represents the highest degree of similarity.

16. The image orientation determination method according to claim 13, further comprising:

calculating the degree of training image similarity by calculating, in accordance with the image features of the positive training image and negative training image related to an orientation in a predetermined direction that are stored in the image features storage section, image features related to an orientation in a different direction.

17. The image orientation determination method according to claim 13 further comprising:

detecting that the determined image orientation is different from the actual orientation of the input image; and when detection is performed to ensure that the orientation of the input image is different from the determined image orientation, registering image features related to the orientation of a positive training image used for input image orientation determination in the image features storage section as the image features of the negative training image.

18. The image orientation determination method according to claim 17, further comprising:

calculating the difference between the orientation similarity of image features related to the orientation of the positive training image used for input image orientation determination and the orientation similarity of image features for an orientation different from the orientation of the image, and, when the calculated orientation similarity difference is not greater than a predetermined value, registering the image features for the different orientation in the image features storage section as the image features of the negative training image.

19. The image orientation determination method according to claim 13, further comprising:
calculating the positive image similarity and the negative image similarity in accordance with the image features of both the positive training image and the negative training image that are stored in the image features storage section; and
deciding to determine the orientation of the input image when the negative image similarity is higher than the predetermined second threshold value and the difference or ratio between the positive image similarity and the negative image similarity is not smaller than a predetermined value.

20. The image orientation determination method according to claim 13, further comprising:
calculating the degree of similarity between the extracted image features of the input image and the image features of an image having a composition at least showing the sky and plants, the sky and a water surface, the sky and flowers, the sky and snow, or the sky at sunset, which is a positive training image stored in the image features storage section.

21. The image orientation determination method according to claim 13, further comprising:
calculating the degree of similarity between the extracted image features of the input image and the image features of an image having a macro composition, which is a negative training stored in the image features storage section.

22. The image orientation determination method according to claim 13, further comprising:
determining the orientation of the input image by using the orientation-specific features storage section for storing image features in relation to the orientation of a positive training image, which is used as a training image.

23. An image orientation determination method comprising:
extracting from an input image, image features indicative of a disposition feature of each element included in an image;
calculating training image similarity indicative of the degree of similarity between the extracted image features of the input image and image features stored in an image features storage section for storing the image features of a negative training image, which is an image inappropriate for image orientation determination;
deciding not to determine the orientation of the input image when the degree of training image similarity between the image features of the input image and the image features of the negative training image is not lower than a predetermined threshold value, and deciding to determine the orientation of the input image when the degree of training image similarity between the image features of the input image and the image features of the negative training image is lower than the predetermined threshold value; and
when a decision is made to determine the orientation of the input image, calculating orientation similarity indicative of the degree of similarity between the image features of the input image and image features stored in an orientation-specific features storage section for storing the image features in relation to the orientation of a positive training image, which is an image appropriate for image orientation determination, and, when the calculated orientation similarity satisfies a predetermined condition, determining the orientation of the input image in accordance with the orientation of the positive training image related to the image features stored in the orientation-specific features storage section.

24. An image orientation determination method comprising:
extracting from an input image features indicative of a disposition feature of each element included in an image;
calculating training image similarity indicative of the degree of similarity between the extracted image features of the input image and image features stored in an image features storage section for storing the image features of a positive training image, which is an image appropriate for image orientation determination;
deciding to determine the orientation of the input image when the degree of training image similarity between the image features of the input image and the image features of the positive training image is higher than a predetermined threshold value; and
when a decision is made to determine the orientation of the input image, calculating orientation similarity indicative of the degree of similarity between the image features of the input image and image features stored in an orientation-specific features storage section for storing the image features in relation to the orientation of the positive training image, and, when the calculated orientation similarity satisfies a predetermined condition, determining the orientation of the input image in accordance with the orientation of the positive training image related to the image features stored in the orientation-specific features storage section.

25. An image orientation determination program causing a computer to perform:
an image features extraction process for extracting from an input image, image features indicative of a disposition feature of each element included in an image;
an image similarity calculation process for calculating training image similarity indicative of the degree of similarity between the image features of the input image that is extracted in the image features extraction process and image features that is stored in an image features storage section for storing the image features of a positive training image, which is an image appropriate for image orientation determination, and the image features of a negative training image, which is an image inappropriate for image orientation determination;
an image orientation determination decision process for deciding to determine the orientation of the input image when positive image similarity, which is the degree of training image similarity between the image features of the input image and the image features of the positive training image, is higher than a predetermined first threshold value, and deciding not to determine the orientation of the input image when negative image similarity, which is the degree of training image similarity between the image features of the input image and the image features of the negative training image, is not lower than a predetermined second threshold value; and
when a decision is made in the image orientation determination decision process to determine the orientation of the input image, an image orientation determination process for calculating orientation similarity indicative of the degree of similarity between the image features of the input image and image features stored in an orientation-specific features storage section for storing the orientation of the positive training image in relation to the image features, and determining the orientation of the input image in accordance with the orientation of the positive training image related to the image features stored in the orientation-specific features storage section when the calculated orientation similarity satisfies a predetermined condition.

26. The image orientation determination program according to claim 25, further causing the computer to perform:
an image orientation correction process for correcting the orientation of the input image in accordance with the image orientation determined by the image orientation determination process.

27. The image orientation determination program according to claim 25,
wherein, when the predetermined condition is satisfied as the image-orientation-specific similarity of image features represents the highest degree of similarity, the computer performs the image orientation determination process to determine the orientation of the input image in accordance with the orientation of the training image related to the image features stored in the orientation-specific features storage section.

28. The image orientation determination program according claim 25,
wherein the computer performs the image similarity calculation process to calculate the degree of training image similarity by calculating, in accordance with the image features of the positive training image and negative training image related to an orientation in a predetermined direction that are stored in the image features storage section, image features related to an orientation in a different direction.

29. The image orientation determination program according to claim 25, further causing the computer to perform:
a detection process for detecting that the image orientation determined by the image orientation determination process is different from the actual orientation of the input image; and
when detection is performed by the detection process to ensure that the orientation of the input image is different from the determined image orientation, a negative image information registration process for registering image features related to the orientation of a positive training image used for input image orientation determination by the image orientation determination process in the image features storage section as the image features of the negative training image.

30. The image orientation determination program according to claim 29,
wherein the computer performs the negative image information registration process to calculate the difference between the orientation similarity of image features related to the orientation of the positive training image used for input image orientation determination by the image orientation determination process and the orientation similarity of image features for an orientation different from the orientation of the image, and, when the calculated orientation similarity difference is not greater than a predetermined value, register the image features for the different orientation in the image features storage section as the image features of the negative training image.

31. The image orientation determination program according claim 25,
wherein the computer performs the image similarity calculation process to calculate the positive image similarity and the negative image similarity in accordance with the image features of both the positive training image and the negative training image that are stored in the image features storage section, and performs the image orientation determination decision process to decide to determine the orientation of the input image when the negative image similarity is higher than the predetermined second threshold value and the difference or ratio between the positive image similarity and the negative image similarity is not smaller than a predetermined value.

32. The image orientation determination program according claim 25,
wherein the computer performs the image similarity calculation process to calculate the degree of similarity between the image features of the input image that is extracted by the image features extraction process and the image features of an image having a composition at least showing the sky and plants, the sky and a water surface, the sky and flowers, the sky and snow, or the sky at sunset, which is a positive training image stored in the image features storage section.

33. The image orientation determination program according to claim 25,
wherein the computer performs the image similarity calculation process to calculate the degree of similarity between the image features of the input image that is extracted by the image features extraction process and the image features of an image having a macro composition, which is a negative training image stored in the image features storage section.

34. The image orientation determination program according to claim 25,
wherein the computer performs the image orientation determination process to determine the orientation of the input image by using the orientation-specific features storage section for storing image features in relation to the orientation of a positive training image, which is used as a training image.

35. An image orientation determination program causing a computer to perform:
an image features extraction process for extracting from an input image, image features indicative of a disposition feature of each element included in an image;
an image similarity calculation process for calculating training image similarity indicative of the degree of similarity between the image features of the input image that is extracted in the image features extraction process and image features that is stored in an image features storage section for storing the image features of a negative training image, which is an image inappropriate for image orientation determination;
an image orientation determination decision process for deciding not to determine the orientation of the input image when the degree of training image similarity between the image features of the input image and the image features of the negative training image is not lower than a predetermined threshold value, and deciding to determine the orientation of the input image when the degree of training image similarity between the image features of the input image and the image features of the negative training image is lower than the predetermined threshold value; and when a decision is made in the image orientation determination decision process to determine the orientation of the input image, an image orientation determination process for calculating orientation similarity indicative of the degree of similarity between the image features of the input image and image features stored in an orientation-specific features storage section for storing the image features in relation to the orientation of a positive training image, which is an image appropriate for image orientation determination, and, when the calculated orientation similarity satisfies a predetermined condition, determining the orientation of the input image in accordance with the orientation of the positive training image related to the image features stored in the orientation-specific features storage section.

36. An image orientation determination program causing a computer to perform:
   an image features extraction process for extracting from an input image, image features indicative of a disposition feature of each element included in an image;
   an image similarity calculation process for calculating training image similarity indicative of the degree of similarity between the image features of the input image that is extracted in the image features extraction process and image features that is stored in an image features storage section for storing the image features of a positive training image, which is an image appropriate for image orientation determination;
   an image orientation determination decision process for deciding to determine the orientation of the input image when the degree of training image similarity between the image features of the input image and the image features of the positive training image is higher than a predetermined threshold value; and
   when a decision is made in the image orientation determination decision process to determine the orientation of the input image, an image orientation determination process for calculating orientation similarity indicative of the degree of similarity between the image features of the input image and image features stored in an orientation-specific features storage section for storing the image features in relation to the orientation of the positive training image, and, when the calculated orientation similarity satisfies a predetermined condition, determining the orientation of the input image in accordance with the orientation of the positive training image related to the image features stored in the orientation-specific features storage section.

* * * * *